A. A. BORSSE.
DETACHABLE UTENSIL HANDLE.
APPLICATION FILED DEC. 7, 1917.
1,268,089.                                    Patented June 4, 1918.
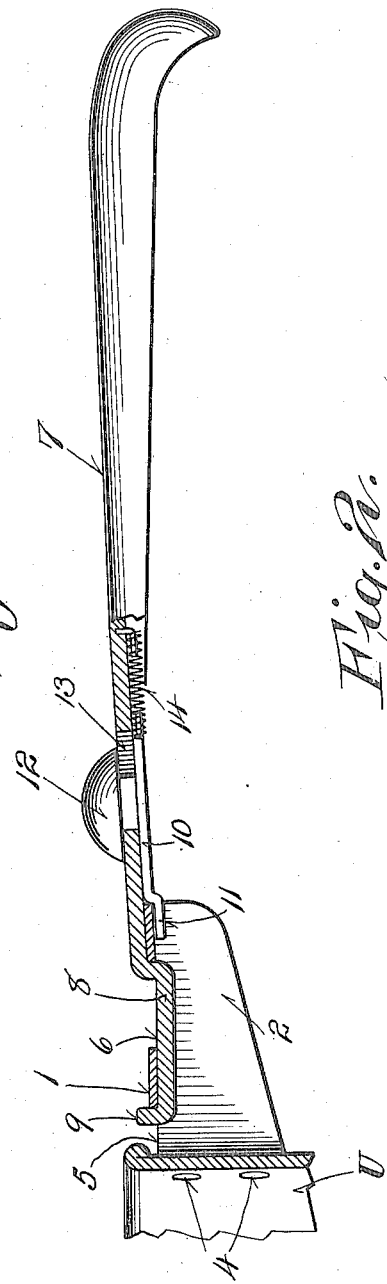
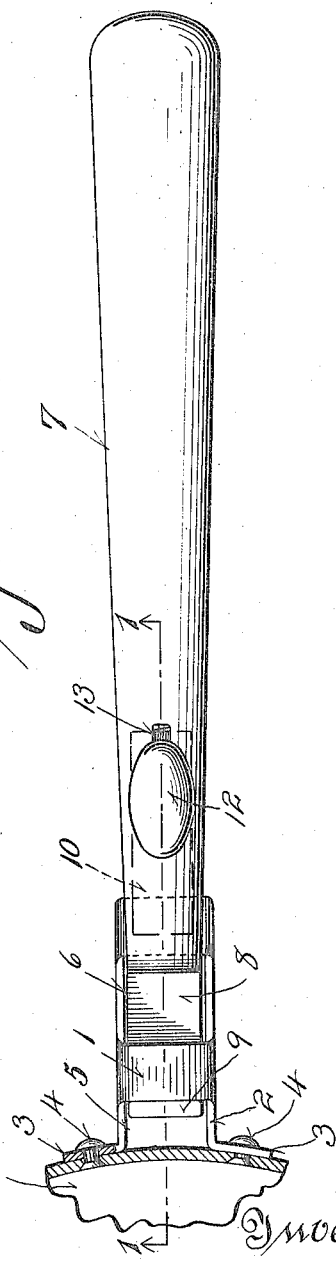

UNITED STATES PATENT OFFICE.

ANTON A. BORSSE, OF SHEBOYGAN, WISCONSIN, ASSIGNOR OF ONE-HALF TO GEORGE PIRC, OF SHEBOYGAN, WISCONSIN.

DETACHABLE UTENSIL-HANDLE.

1,268,089.  Specification of Letters Patent.  Patented June 4, 1918.

Application filed December 7, 1917. Serial No. 205,989.

*To all whom it may concern:*

Be it known that I, ANTON A. BORSSE, a citizen of the United States, and resident of Sheboygan, in the county of Sheboygan and State of Wisconsin, have invented certain new and useful Improvements in Detachable Utensil-Handles; and I do hereby declare that the following is a full, clear, and exact description thereof.

My invention refers to new and useful improvements in handles, more particularly to those which are adapted for detachable connection with cooking and other utensils.

In certain classes of utensils, especially those which are adapted to be heated it is advisable to provide the same with detachable handles or other means whereby the same may be removed from a stove or the like while in a heated condition without danger or discomfort to the one performing the operation. In carrying out the idea I have invented the present detachable handle which is of very simple construction and therefore can be inexpensively manufactured and marketed, and is very readily manipulated.

The invention is particularly designed to be used in connection with baleless utensils.

With the foregoing and other objects and advantages in view my invention resides in the novel features of construction, combination and arrangement of parts which will be hereinafter more particularly described and claimed and shown in the drawings wherein:

Figure 1 represents a vertical sectional view through a portion of a utensil having my improved detachable handle applied thereto, the latter being partly in section, said section being upon the plane of the line 1—1 of Fig. 2, and Fig. 2 is a plan view of the handle shown in Fig. 1 applied to a utensil, the latter being in horizontal section.

Inasmuch as I do not desire to be limited to any particular kind of utensil only a fragment of a vessel has been illustrated, the same being designated by the reference character U.

However, all utensils with which my improved handle is designed to be used are preferably provided with an ear or the like 1 projecting from the side wall or other suitable part of the utensil. This forms the means for readily connecting the handle to the receptacle.

In its illustrated embodiment the ear comprises a laterally extending horizontally disposed plate having depending reënforcing and attaching flanges 2, the inner ends of which are bent laterally as at 3 for securement to the wall of the utensil by rivets 4, although it is obvious that various other means might readily be employed for effecting this attachment. The ear is therefore substantially inverted U-shaped in cross section. The base portion which forms the ear proper is provided with slots or openings 5 and 6, one of which is adjacent the inner end while the other is substantially midway of the ends.

The handle 7 which is used in combination with the ear is more or less of conventional design with the exception of its attaching end which is offset as at 8, the free end of the offset portion being bent laterally or provided with a lug 9. The purpose of this offset portion and the laterally turned end is evident from Fig. 1 wherein it will be noted that the attaching end of the handle is projected through the slot 6 until the lug 9 can engage the outer wall of the slot 5, the upper face of the offset portion being then engaged with the under side of the ear 1; the portion of the handle adjacent said offset portion is in contact with the upper surface of said ear.

For making the connection between the handle and the ear more positive, a sliding keeper 10 having an offset end 11 is carried by the under side of the former, said offset end being adapted to engage the under surface of the ear. The keeper is readily manipulated by a button or finger piece 12 the shank of which extends through the slot 13 in the handle and is secured to said keeper. Said keeper is normally retained in projected position by means of an expansile spring 14.

From the foregoing description taken in connection with the accompanying drawing the operation of this invention is evident without further explanation. From this drawing it will be noted that an extremely simple detachable handle has been produced and one which may be largely constructed by stamping from heavy gage sheet metal.

I claim:—

1. The combination with an ear having a slot, of a detachable handle having one end off-set with respect to the other part to form a shoulder, said offset portion being disposed through the slot and engaged with the under side of the ear, the shoulder engaging one wall of the slot with the portion of the handle adjacent said shoulder in contact with the upper side of the ear, a shouldered keeper plate carried by the handle, the shoulder of said plate being engaged with the end of the ear and the free end portion with the under side of the latter, and means for moving the keeper plate into such engagement.

2. The combination with an ear having a pair of spaced slots, of a detachable handle having one end portion offset with respect to the other part to form a shoulder, said offset portion being disposed through one of said slots and engaged with the under side of the ear, the shoulder engaging one wall of said slot with the portion of the handle adjacent said shoulder in contact with the upper side of the ear, a lug formed on the free end of the offset portion of the handle and disposed through the other slot, a shouldered keeper plate carried by the handle, the shoulder of said plate being engaged with the end of the ear and the free end portion with the under side of the latter, and means for moving the keeper plate into such engagement.

3. A detachable handle of the class described having one end portion offset with respect to the other part, the free end of said offset portion being turned laterally, the part of the handle adjacent said offset portion having a longitudinal slot, a keeper plate slidably engaged with one side of said handle, a finger piece having a shank extended through said slot and engaged with said keeper plate, and means for holding said keeper plate in one position.

In testimony that I claim the foregoing I have hereunto set my hand at Sheboygan, in the county of Sheboygan and State of Wisconsin.

ANTON A. BORSSE.

Copies of this patent may be obtained for five cents each, by addressing the "Commissioner of Patents, Washington, D. C."